US008842121B2

(12) United States Patent
Akenine-Möller et al.

(10) Patent No.: US 8,842,121 B2
(45) Date of Patent: Sep. 23, 2014

(54) STREAM COMPACTION FOR RASTERIZATION

(75) Inventors: Tomas Akenine-Möller, Lund (SE); Jon N. Hasselgren, Bunkeflostrand (SE); Carl J. Munkberg, Malmö (SE); Robert M. Toth, Lund (SE); Franz P. Clarberg, Lund (SE)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 13/020,271

(22) Filed: Feb. 3, 2011

(65) Prior Publication Data
US 2012/0201467 A1 Aug. 9, 2012

(51) Int. Cl.
G06F 15/80 (2006.01)
G09G 5/00 (2006.01)
G06T 15/00 (2011.01)

(52) U.S. Cl.
CPC .................................. *G06T 15/005* (2013.01)
USPC .......................................... 345/505; 345/614

(58) Field of Classification Search
CPC ....... G06T 15/005; G06T 15/20; G06T 15/40; G06T 2210/52; G06F 9/3885
USPC ................................................... 345/614, 505
See application file for complete search history.

(56) References Cited

U.S. PATENT DOCUMENTS

| | | | |
|---|---|---|---|
| 6,700,584 B1 * | 3/2004 | Wood | 345/581 |
| 6,704,026 B2 | 3/2004 | Kurihara et al. | |
| 8,078,930 B2 | 12/2011 | Boldt et al. | |
| 8,144,156 B1 * | 3/2012 | Baldwin | 345/501 |
| 8,195,858 B1 * | 6/2012 | Keil et al. | 710/117 |
| 2002/0097241 A1 * | 7/2002 | McCormack et al. | 345/423 |
| 2006/0055695 A1 * | 3/2006 | Abdalla et al. | 345/426 |
| 2009/0222644 A1 | 9/2009 | Inoue et al. | |

OTHER PUBLICATIONS

PCT/US2011/067945 Search Report with Written Opinion of the International Searching Authority mailed Jul. 24, 2012 (10 pgs).

* cited by examiner

*Primary Examiner* — Hau Nguyen
(74) *Attorney, Agent, or Firm* — Trop, Pruner & Hu, P.C.

(57) ABSTRACT

A single instruction multiple data (SIMD) processor with a given width may operate on registers of the same width completely filled with fragments. A parallel set of registers are loaded and tested. The fragments that fail are eliminated and the register set is refilled from the parallel set.

30 Claims, 3 Drawing Sheets

STREAM COMPACTION FOR RASTERIZATION

BACKGROUND

This relates generally to graphics processing and, particularly, to rasterization.

Rasterization pipelines work on blocks of fragments with an implicitly encoded position. For example, the rasterizer may work on 2×2 blocks of fragments. A number of tests are then performed based on the rasterization of triangles. In some cases, these tests may determine that further processing is no longer needed. Examples of such tests are depth tests, alpha tests, shading tests, etc.

In some cases, single instruction multiple data (SIMD) utilization is sacrificed because some fragments in a SIMD register may be discarded due to tests while other fragments persist and require subsequent processing in said SIMD register. Any subsequent computations on the SIMD register data will include discarded fragments, resulting in sub-optimal efficiency.

DETAILED DESCRIPTION

In accordance with some embodiments, single instruction multiple data (SIMD) streams are treated as streams of individual fragments. That is, the fragments are considered as explicitly encoding a position, but each fragment is considered separately. The fragments may come from different triangles. Fine grained stream compaction may be performed after each processing step.

A micropolygon is a rendering primitive smaller than a pixel. As a result of handling the fragments individually, single instruction multiple data utilization may be improved in some embodiments. In some embodiments, real-time micropolygon rasterization pipelines may use pixel sized triangles, but other arrangements are also possible.

Figure 1:
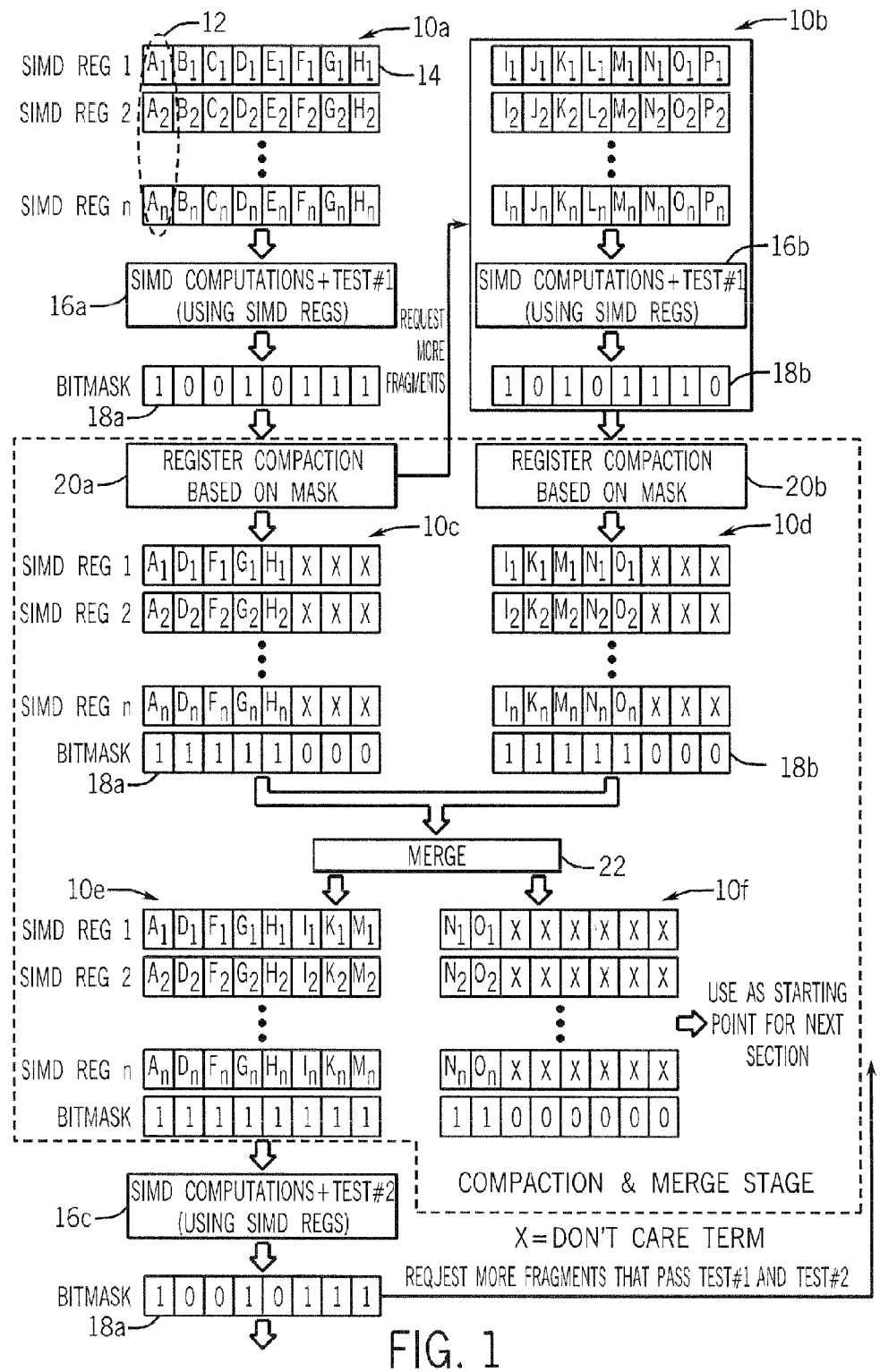
FIG. 1 is a flow chart for one embodiment of the present invention.

Referring to FIG. 1, a single instruction multiple data architecture is depicted with a width of eight. Of course, other widths may also be utilized. Thus, each of the register sets 10a and 10b has a width of eight fragments wide. Each fragment is indicated by a capital letter in FIG. 1 and the portions of those fragments are indicated by subscript numbers. Thus, for example, the fragment A, indicated at 12, has portions $A_1$-$A_n$. In this case, there are eight fragments, A-H in the register set 10a and fragments I-P in the register set 10b.

As used herein, the term "fragment" refers to the entire representation of an abstract sample in the rendering pipeline. A fragment may be a fixed point pixel coordinate to start with and later the data may be augmented with the fragment's color and depth, as examples.

Thus, there are n values for each fragment, so that each fragment, such as the fragment A, has n values 1-n. The values may be floating point numbers, integers, or a mix that are needed to describe the fragment.

All the information for the eight fragments is packed into n SIMD registers 14 or memory locations in a structure-of-array (SOA) format. Then, the SIMD calculations are performed in parallel on a central processing unit or graphics processing unit for these eight fragments, together with some testing of the fragments, as indicated at 16a and 16b.

The test on a fragment at 16 determines whether that particular fragment continues to be operated on or whether its processing is to be terminated. This testing results in a bit mask 18a or 18b, where 0 indicates, in this example, that the fragment shall be terminated and 1 indicates that further processing is required for the fragment. Examples of such tests include tests to determine whether a sample position of a fragment is inside the primitive, such as a triangle, polygon, microtriangle, or micropolygon, determining if the fragment lies closer to the camera than previously drawn fragments (i.e. depth testing), etc.

At this point, the fragment processing continues in those SIMD registers 14, but the fragments with 0's in the bit mask 18a or 18b do not need further computation. This is more efficient, in some embodiments, compared to carrying those fragments and computing results that will not, be used.

Hence, compaction is applied to the data so that fragments with 0 masks are removed, as indicated at 20a and 20b, and fragments with set masks are packed linearly into the open registers, as indicated at 10c and 10d. This is done to all of the fragments and all the data. In other words, a parallel set of eight fragments may be handled in register set 10b on the right in FIG. 1. The register sets 10a and 10b are compacted and tested in the same way. The second set of fragments in the register sets 10b and 10d in effect provide the replacements to fill up the register sets 10a or 10c when sub-fragments are discarded.

In the example depicted in FIG. 1 at 10c, the right three fragments (corresponding to B, C and E before compaction) have been discarded and are indicated by x's or don't care terms. To fill out these vacant three fragment 12 slots in the SIMD register set 10c, more active fragments are requested from the parallel set processed in register set 10b or 10d. The goal is to gather a complete set of fragments that completely fills the register set 10c so the two bit masks 18a and 18b, and their respective register sets 10c and 10d are merged, as indicated at 22.

There are various merger possibilities. One is that the two bit masks have at least one but less than two complete register sets in total and, hence, there are enough fragments to fill up one set of registers with width eight and there will be a remainder register set with some number of fragments, but the remainder register set 10f is not completely full. This packing of register sets, testing, and merging may be continued any arbitrary number of times. The idea is to continually perform tests on more fragments in one or more parallel sets, followed by compaction, until at least one full register set of active fragments whose bit mask is all 1's can be created. Any remaining fragments, such as those indicated in the register set 10f, are saved for the next iteration in one embodiment. In some embodiments, tests are continually performed on fragments in only one set, followed by compaction, using the remainder fragments from the previous iteration as input to the compaction and merge stage. The merge stages 22 and 24 may operate in a first-in-first-out (FIFO) order in one embodiment.

Once an entire SIMD register set 10 is full, as indicated by the register 10e in FIG. 1, full SIMD utilization or full usage of the hardware is achieved for the next stage of computations and testing, indicated at 16c. So the next step is to perform the computations and tests of the second variety on the registers in the unit 16c, which results in the new bit mask 18a with 0's and 1's. Again, if there are 0's in the mask, a full SIMD utilization is not obtained without compaction using the techniques already described. Thus, iterations continue until complete sets of registers with all 1's in the bit mask are identified.

In general, the algorithm may include a number of computational kernels with short data queues to communicate with each other. In an embodiment where two registers and corresponding bit masks are merged in each step, the necessary output queue capacity and SIMD widths for a kernel is its data amplification rate plus one. A computational kernel can run in parallel or according to some priority order if the input queue contains at least a full SIMD width worth of work or if the pipeline is being flushed.

The following pseudo code of an example of three SIMD tests where the plus/equal operator means compact-and-merge, as described above:

```
while(not done with all work)
    if (queue2.elements ≥ SIMD_WIDTH)
        SIMD_TEST3(queue2);
    else if (queue1.elements ≥ SIMD_WIDTH)
        queue2 += SIMD_TEST2(queue1);
    else if (queue 0.elements ≥ SIMD_WIDTH)
        queue1 += SIMD_TEST1(queue0);
    else
        enter more elements into queue0;
end while;
```

This approach only requests new data, in some embodiments, when needed to fill up an SIMD register. This approach reduces the likelihood of creating a very long list of fragments, performing computations and testing of the entire list and then doing stream compaction. As a result, greater efficiencies may be achieved in some embodiments.

Figure 2:
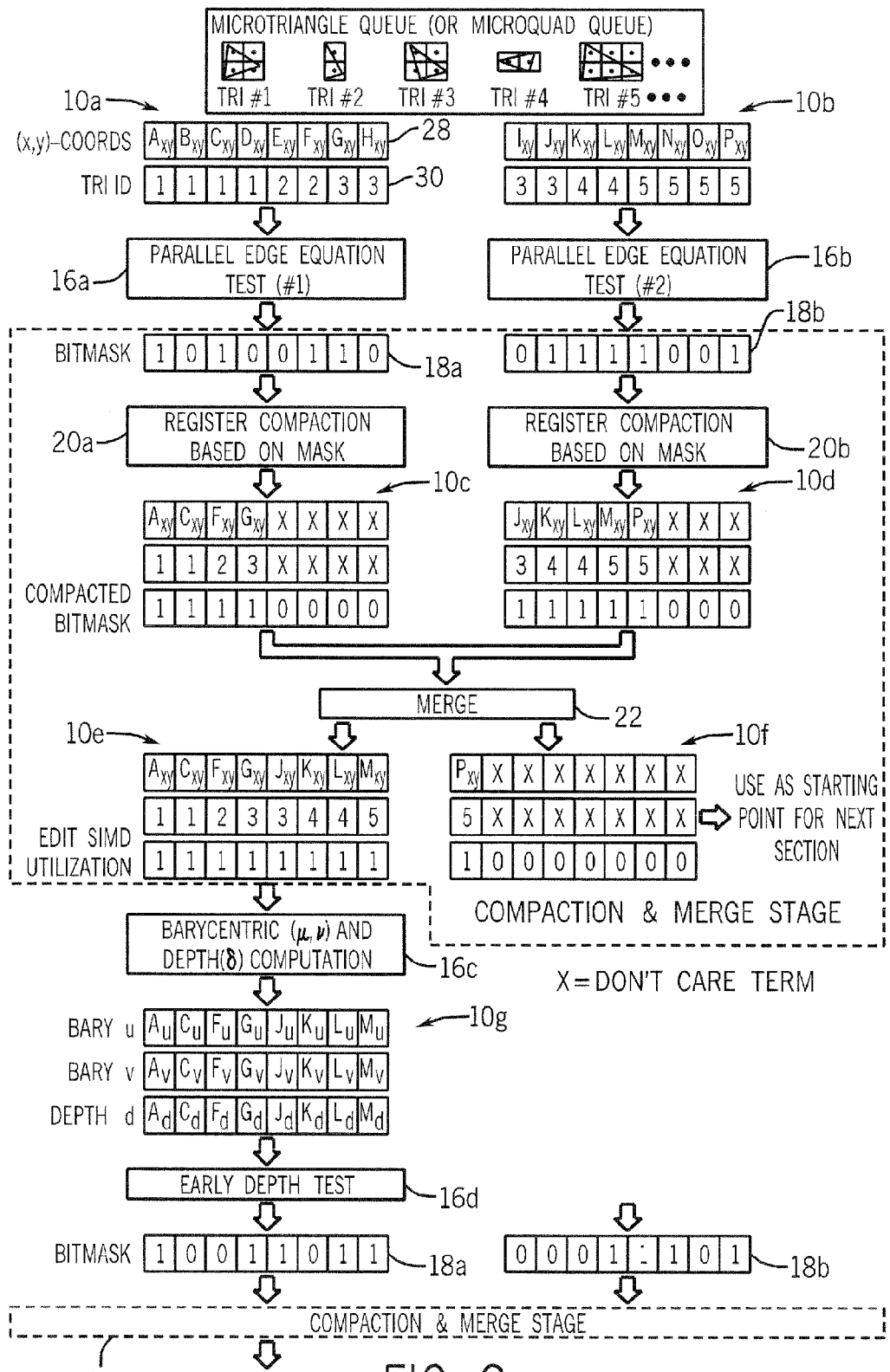
FIG. 2 is a flow chart for another embodiment of the present invention.

Referring next to FIG. 2, in a specific use case of micropolygon rasterization, the concepts already described are further illustrated. The idea is to rasterize many small triangles, for example, microtriangles, which are sub-pixel sized. However, the same concepts can also be used to rasterize triangles of different sizes or other polygons efficiently.

Even when large triangles cannot be efficiently rendered, a combination of the techniques described herein and hierarchical rasterization may still be possible. For example, hierarchical rasterization can be done on the top levels and, for blocks of pixels completely inside the triangle, shading can be done as usual. At the edges of the triangles, the technique described herein can be used to get better SIMD edge utilization.

At the top of FIG. 2, a microtriangle queue or microquad queue of incoming small microtriangles of various sizes are to be rasterized and the samples of fragments inside the triangles are to be shaded. The bounding boxes of the triangles are computed and then the fragments and samples x,y coordinates (x,y-COORDS) inside the boxes are put into the SIMD registers 28. A triangle identifier (TRI ID) may also be stored for each sample or fragment in another register 30.

The process of gathering the x,y coordinates within the bounding box itself can be performed using the algorithm described by Fatahalian in "Data-Parallel Rasterization of Micropolygons With Defocus or Motion Blur," HPG 2009. Alternatively, it can also be done by looping over each bounding box with an SIMD sized stamp and testing each x,y coordinate, following by compact-and-merge. The computational cost of gathering the input is assumed to be small compared to the cost of edge equation tests and unnecessary subsequent work within the rasterizer.

At this point, the SIMD registers are fully loaded with values to test and the next step is to perform an edge equation test 16a, 16b which determines if a sample/fragment is inside the triangle. Here, the triangle identifier is used to find the edge equation that should be used for each sample/fragment.

After this test, a number of samples/fragments are found to be inside the respective triangles and this is indicated in the resulting bit masks 18a or 18b. Then the pertinent SIMD registers with the sample/fragment x,y coordinates, triangle identifiers, etc., are compacted, as indicated at 20a and 20b, in the same manner so that the ones in the bit mask do not have any zeros in between and are located in the most significant bits in one embodiment. Since the bit mask contains zeroes in this example, full SIMD utilization is not achieved if processing simply continues. Therefore, more triangles are processed in the same way and the edge equation inside test is performed, followed by compaction of register sets 10c and 10d.

Finally, the registers are merged at 22 so that the SIMD registers are full of valid values to be tested and, again, full SIMD utilization at a subsequent testing step may be achieved.

The triangle inside-tests may include three edge tests. The compact and merge step can be performed in between each of the three edge tests for even higher SIMD utilization within the inside-test.

Next, the pipeline can compute depth per sample/fragment and then perform a pixel depth test on the data in register 10e. A barycentric and depth computation may be done at 16c to create register set 10g. The set 10g is early depth tested at 16d to form additional bit masks 18a, 18b. This is also a test in the same way that edge equation inside computation is a test. Hence, a similar compact and merge process may take place here as well at 24. Examples of other tests include alpha testing, stencil testing, and shading computations with write backs to various buffers, such as color, depth, stencil, alpha. Write conflicts (i.e. writes to the same pixel coordinates) may be handled at this point.

Again, the implementation example in pseudo code follows with, again, the += operator indicating compaction and merge.

```
Initialize queue0 to be empty;
while(not done)
    if (queue2.elements ≥ SIMD_WIDTH)
        computeShadingOnSamplesSIMD(queue2);
        writeBackToBufferWithConflictHandlingSIMD(queue2);
    else if (queue1.elements ≥ SIMD_WIDTH)
        computeDepthsSIMD(queue1);
        queue2 += depthTestSIMD(queue1);
    else if (queue0.elements ≥ SIMD_WIDTH)
        queue1 += edgeEquationInsideTestSIMD(queue0);
    else
        enter more fragments/samples from tris into queue0;
end while;
```

The queues may be drained when no more input data is available, by executing the various kernels on the remaining elements. In addition, compaction may either be performed after each of the three edge tests, or it may be done after all three edge tests are completed.

In the embodiment of FIG. 1, the compaction algorithm in the form described above will no longer output fragments in a 2×2 quad structure, as is common in rendering pipelines. This means that the common approach of computing screen space derivatives (used mainly for texture filtering) through finite differences may not be used. However, given a grid structure from the tessellator, object space derivatives can still be computed using quad-based finite differences. Also, per-pixel screen space derivatives can be computed by emitting code for computing derivatives in the pixel shader. This derivative computation can be done by computing finite differences or by using automatic differentiation techniques. This extra shader code incurs a processing overhead because more pixel shader instructions would have to be evaluated.

Alternatively, the compact and merge process described above can be extended to work on 2×2 quad structures by working with blocks of four elements each, where a block is considered active if at least one of its elements is active. For an SIMD width of eight, this results in compaction of two blocks of four elements each. This compaction allows use of existing finite different operators, but reduces efficiency.

Compaction may lead to SIMD batches containing fragments from multiple triangles. Units following the rasterizer in the graphics pipeline may be extended to process SIMD batches containing data from different triangles. This extension includes increasing the size of temporary data storage in the pipeline to hold data for several triangles simultaneously. For example, edge equations may be stored for many triangles. Since the fragments may belong to different triangles, they also may occupy the same pixel position. Fragments may cause write conflicts when updating the frame buffer. Thus, write conflicts should be detected and solved by serializing the frame buffer updates, as illustrated in the pseudo code above.

Figure 3:
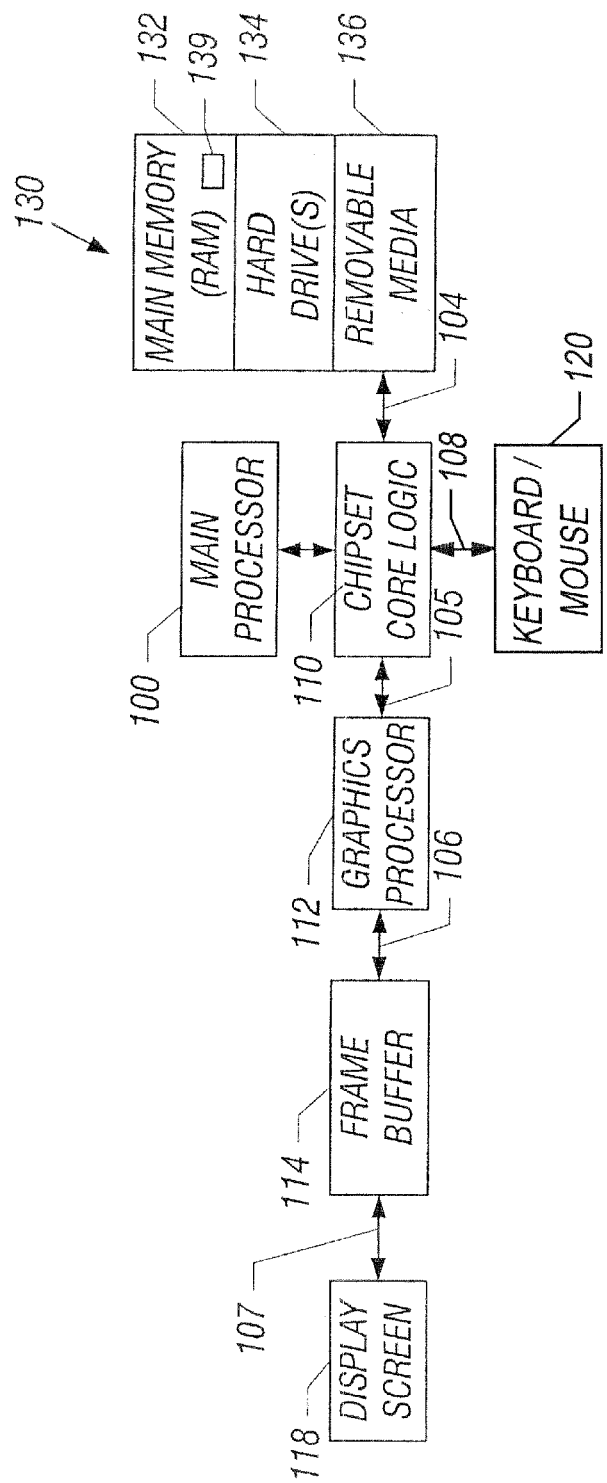
FIG. 3 is a schematic for one embodiment of the present invention.

The computer system 130, shown in FIG. 3, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 or any available memory within the graphics processor. Thus, in one embodiment, the code to perform the sequences of FIGS. 1 and 2 may be stored in a non-transitory machine or computer readable medium, such as the memory 132 or the graphics processor 112, and may be executed by the processor 100 or the graphics processor 112 in one embodiment.

FIGS. 1 and 2 are flow charts. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIGS. 1 and 2.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   assembling a parallel set of m fragments in n registers;
   testing individual fragments of said m fragments;
   eliminating fragments of said m fragments based on said testing to end up with p fragments where p is less than m and creating empty spaces in said n registers; and
   merging the p fragments after eliminating some, but not all, of the m fragments to entirely fill the n registers with fragments that were not eliminated by accessing additional fragments from another set of fragments to fill register vacancies not filled by the p fragments.

2. The method of claim 1 including performing micropolygon rasterization.

3. The method of claim 1 including providing coordinates and polygon identifiers in said fragments.

4. The method of claim 3 including performing an edge equation test and selecting the edge equation using a polygon identifier.

5. The method of claim 1 including performing a plurality of tests and merging after each test.

6. The method of claim 1 including storing the test results in a bit mask.

7. The method of claim 1 including using a single instruction multiple data processor.

8. The method of claim 7 including providing a number of fragments in a register equal to the width of the single instruction multiple data processor.

9. The method of claim 1 including detecting write conflicts.

10. The method of claim 9 including resolving write conflicts by serializing frame buffer updates.

11. A non-transitory computer readable medium storing instructions to enable a computer to:
    assemble parallel set of m fragments in n registers;
    test individual fragments of said m fragments;
    eliminate fragments of said m fragments based on said testing to end up with p fragments where p is less than m and creating empty spaces in said n registers; and
    merge the p fragments after eliminating some, but not all, of the m fragments to entirely fill the n registers with fragments that were not eliminated by accessing additional fragments from another set of fragments to fill register vacancies not filled by the p fragments.

12. The medium of claim 11 further storing instructions to perform micropolygon rasterization.

13. The medium of claim 11 further storing instructions to provide coordinates and polygon identifiers in said fragments.

14. The medium of claim 11 further storing instructions to perform a plurality of tests and to merge after each test.

15. The medium of claim 13 further storing instructions to test by performing an edge equation test and selecting the edge equation using a polygon identifier.

16. The medium of claim 11 further storing instructions to store the test results in a bit mask.

17. The medium of claim 11 further storing instructions to use a single instruction multiple data processor.

18. The medium of claim 17 further storing instructions to provide a number of fragments in a register equal to the width of the single instruction multiple data processor.

19. The medium of claim 11 further storing instructions to detect write conflicts.

20. The medium of claim 19 further storing instructions to resolve write conflicts by serializing frame buffer updates.

21. An apparatus comprising:
a processor to test individual fragments of parallel sets of m fragments in n registers, eliminate fragments of said m fragments based on the testing to end up with p fragments where p is less than m and creating empty spaces in said n registers, and merge the p fragments after eliminating some, but not all, of the m fragments to entirely fill the n registers with fragments that were not eliminated by accessing additional fragments from another set of fragments to fill register vacancies not filled by the p fragments; and
a storage coupled to said processor.

22. The apparatus of claim 21 wherein said apparatus includes a graphics processing unit.

23. The apparatus of claim 22 wherein said apparatus includes a single instruction multiple data processing unit.

24. The apparatus of claim 23, said processor to provide a number of fragments in a register equal to the width of the single instruction multiple data processor.

25. The apparatus of claim 21, said processor to perform micropolygon rasterization.

26. The apparatus of claim 21, said processor to provide coordinates and polygon identifiers in said fragments.

27. The apparatus of claim 26, said processor to perform an edge equation test and select the edge equation using a polygon identifier.

28. The apparatus of claim 21, said processor to perform a plurality of tests with merging after each test.

29. The apparatus of claim 21, said processor to store test results in a bit mask.

30. The apparatus of claim 21, said processor to detect write conflicts and resolve write conflicts by serializing frame buffer updates.

* * * * *